UNITED STATES PATENT OFFICE.

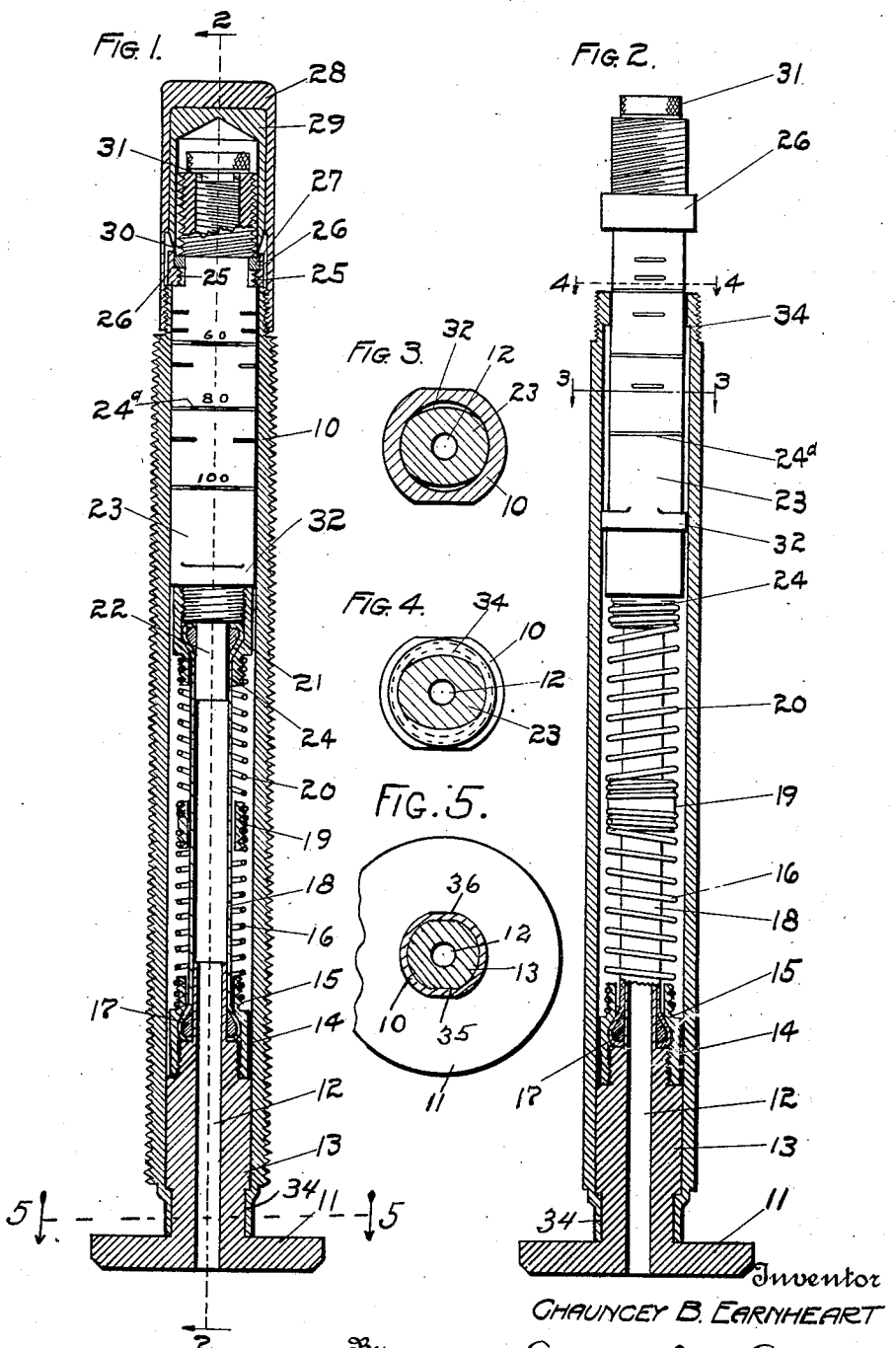

CHAUNCEY B. EARNHART, OF INDIANAPOLIS, INDIANA, ASSIGNOR TO SAFETY-FIRST DEVICES COMPANY, OF INDIANAPOLIS, INDIANA, A CORPORATION.

VALVE FOR PNEUMATIC TIRES.

1,305,264.   Specification of Letters Patent.   Patented June 3, 1919.

Application filed July 9, 1917.   Serial No. 179,466.

*To all whom it may concern:*

Be it known that I, CHAUNCEY B. EARNHEART, a citizen of the United States, and a resident of Indianapolis, county of Marion, and State of Indiana, have invented a certain new and useful Valve for Pneumatic Tires; and I do hereby declare that the following is a full, clear, and exact description thereof, reference being had to the accompanying drawings, in which like letters refer to like parts.

This invention relates to a pressure indicating air valve for pneumatic tires and other receptacles for holding fluid under pressure.

One feature of the invention consists in so constructing a valve stem and the valve carrying member which is slidable therein that they will always be maintained in the same angular relation to each other, that is, the valve carrying member will have no rotary movement within the valve stem and yet be free to have slidable movement longitudinally of the valve stem. Pressure indicating numerals and graduations are placed on opposite sides of said valve carrying member for indicating the pressure within a pneumatic tire or the like, and it is desirable that as the valve carrying member in the valve stem moves inward or outward in the valve stem, the two series of indicating numerals and graduations should always be in their proper positions, facing the two sides of the automobile wheel.

Another feature of the invention is the construction of the valve stem and valve carrying member whereby the valve carrying member may slide longitudinally in said valve stem but can not turn therein nor pass beyond a given position. This is accomplished by flattening one end of the valve stem so that it will have substantially an oval cross section, with the balance thereof rounded, so as to form a shoulder or stop for the valve carrying member. The valve carrying member is also flattened so as to correspond to the oval-shaped end of the stem, and is likewise provided with a shoulder on its lower end formed by having that portion thereof circular in cross section, so that said last mentioned shoulder will engage the shoulder on the other end of the valve stem and act as a stop for the further upward movement of said valve carrying member.

Another feature of the invention herein consists in the use of a double spiral spring for connecting the inner portion of the valve carrying member with the valve stem so as to permit the longitudinal movement of the valve carrying member as, for instance, when actuated by the pressure of the air in the pneumatic tire. Half of said spiral spring is wound in one direction and the other half thereof is wound in the opposite direction so that as said double spring expands or contracts, it will not tend to turn or change the angle or position of the valve carrying member and the pressure indications thereon. In such construction where there is a single spring or a spring coiled in one direction only, when said spring expands or contracts, it tends to turn or change the angle or position of said valve carrying member within the valve stem and causes it often to lock, catch or stick in the valve stem. With this double spring construction this difficulty is avoided and the valve carrying member will always move outward or inward straight, and without any tendency to turn in either direction and lock or stick in the valve stem. This is important because such constructions are relatively small and close fitting and, therefore, there is great danger of the pressure indicating means or valve carrying member sticking in the valve stem and not accurately indicating the pressure in the pneumatic tire, or the condition of the main valve whether it is closed or not.

Another feature of the invention herein consists in means for absolutely preventing any escape of air from the valve. With the ordinary use of the check valve alone air is constantly leaking out which necessitates periodical refilling of the tires, and not only inconveniences the user, but shortens the life of the tire. This invention enables the tire to keep a constant pressure of air. This is accomplished by providing a gasket or washer on the valve carrying member into which an inwardly beveled cap is adapted to embed and make an air tight seal.

The full nature of the invention will be understood from the accompanying drawings and the following description and claims.

Figure 1 is a central vertical cross section through the valve stem and associated parts showing the valve carrying member in side elevation. Fig. 2 is a central vertical cross section taken on the line 2—2 of Fig. 1, showing the valve carrying member in elevation and in an actuated position, and also showing the spiral springs and stem in elevation. Fig. 3 is a cross section taken on the line 3—3 of Fig. 2. Fig. 4 is a cross section taken on the line 4—4 of Fig. 2. Fig. 5 is a sectional view as seen on line 5—5 of Fig. 1.

There is shown herein a valve stem 10 adapted to extend through the inner tube and the parts of a vehicle wheel in the ordinary manner which it is deemed not necessary to show herein, and has on its inner end a head 11 adapted to extend within the inner tube through which an air passage 12 extends. The head 11 is provided with a stem 13 integral therewith having a reduced portion into which the valve stem 10 extends so as to engage therein. The upper end of the stem 13 is provided with threads 14 which engage and secure thereon a threaded sleeve 15 which sleeve is provided with external threads adapted to engage and secure in place the spiral spring 16.

On the outer end of the stem 13 there is secured a nipple 17 over which a rubber tube 18 is stretched for holding it in place. Said tube extends upwardly through the spiral spring 16, the threaded band 19, which is adapted to engage the other end of the spiral spring 16 and the lower end of an oppositely winding spiral spring 20 through which the rubber tube 18 continues to pass so as to be secured at its upper end by the nipple 21 to the projecting stem 22 of the valve carrying member 23.

From the above description it will be seen that the tube 18 and the spring 16 are secured at their lower ends to the stem 13 of the valve head 11. The spiral spring extending upwardly through the valve stem to a band 19 which connects it to an opposite spiral spring 20 which extends upwardly and is secured to the external threads of sleeve 24 which is threaded to the lower end of the valve carrying member 23, the rubber tube 18 being secured to the upper end of the stem 13 by the nipple 17, and extending upwardly through the spiral springs 16 and 20 and being secured at its other end to the stem 22 on the valve carrying member 23. Therefore, the valve carrying member 23 is connected to the head 11 by a yielding means consisting of oppositely spiral springs and a rubber tube. The air passes upwardly through the air passage 12, tube 18, and stem 22, into the valve carrying member 23, whereby the pressure exerted by the air in the tire will force the valve carrying member 23 upwardly against the tension of the rubber tube and the springs 18 and 20 whereby it may be adjusted to register the air pressure in the tire by means of the graduation marks 24ª appearing above the top of the valve stem as shown in Fig. 2.

On the upper end of the valve carrying member there are screw threads 25 on which a sleeve 26 is adapted to be screwed for securing thereon the rubber gasket 27. The valve stem cap 28 is provided with an inner sleeve 29 adapted to be wedged therein, having an inwardly beveled end 30 adapted to engage and be embedded in the rubber gasket 27 when the cap 28 is screwed on to the valve stem. This construction prevents any escape of air which may leak through the check valve 31 which screws into the valve carrying member 23. The check valve 31 may be of any desired construction such as those now commonly used and need not be further described or shown herein.

For permitting the valve carrying member 23 to slide longitudinally in the valve stem, but preventing it from turning laterally therein, one end of the valve stem is flattened on each side so that it will have substantially an oval cross section as shown in Fig. 4. The valve carrying member 23 is likewise flattened so as to correspond with the end of the valve stem whereby it may slide therein but cannot turn laterally. For preventing the valve carrying member 23 from being forced out of the valve stem by the air pressure, there is provided a shoulder or stop 32 which is circular in cross section which is adapted to engage and be stopped by the flanges 34 formed by the upper end of said valve stem being oval in cross section as shown in Figs. 3 and 4. The walls of the recess 34 in the stem of the head 11, into which portions of the stem 10 are crimped to secure the stem to the head, are provided with flattened portions 35, against which portions 36 of the stem 10, are flattened to prevent rotation of the stem on the head. By this simple construction which permits the valve stem and valve carrying member to be made very cheaply the desired results are accomplished.

The invention claimed is:

1. An air valve for receptacles for fluid under pressure including a stationary member, a member the inner surface of which is circular in cross section and having the opening in its outer end restricted and substantially oval shaped longitudinally and yieldingly movable in said stationary member under the influence of the air pressure in said receptacle, said movable member being substantially oval shaped in cross section to fit the opening in the outer end of the stationary member, and pressure indications thereon to indicate the pressure of the fluid, and a circular collar on the lower portion of said movable member for forming a shoulder adapted to engage and be stopped by the oval opening of said stationary member when forced to its upper extremity.

2. An air valve for receptacles for fluid under pressure including a stationary member, and a valve carrying member longitudinally and yieldingly movable in said stationary member under the influence of the air pressure in said receptacle and having pressure indications thereon to indicate the pressure of the fluid, said two members being formed so that the inner member can have no turning or angular movement within the other member, and means surrounding parts of said valve carrying member and adapted to embed in parts carried by the valve carrying member for preventing any escape of air therefrom.

3. An air valve for receptacles for fluid under pressure including a stationary member, a member longitudinally and yieldingly movable in said stationary member under the influence of the pressure in said receptacle and having pressure indications thereon to indicate the pressure of the fluid, said two members being formed so that the inner member can have no turning or angular movement within the other member, a washer mounted on the upper end of said movable member, a cap adapted to be secured over the top of said stationary member and means therein adapted to embed in said washer for preventing any leakage therethrough.

4. An air valve for receptacles for fluid under pressure including a stationary member, a member longitudinally and yieldingly movable in said stationary member under the influence of the pressure in said receptacle and having pressure indications thereon to indicate the pressure of the fluid, said two members being formed so that the inner member can have no turning or angular movement within the other member, a washer on the upper end of said movable member, means for securing said washer thereon, a cap adapted to be secured on the upper end of said stationary member and means in said cap adapted to embed in said washer for preventing any escape of air therethrough.

5. An air valve for receptacles for fluid under pressure including a stationary member, a member longitudinally and yieldingly movable in said stationary member under the influence of the pressure in said receptacle and having pressure indications thereon to indicate the pressure of the fluid, said two members being formed so that the inner member can have no turning or angular movement within the other member, a washer on the upper end of said movable member, a sleeve for securing said washer thereon, a cap adapted to be secured over the upper end of said stationary member, and a sleeve having an inwardly beveled end secured in said cap for embedding in said washer and preventing any escape of air therethrough.

6. An air valve for receptacles for fluid under pressure including a stationary member, a member longitudinally and yieldingly movable in said stationary member under the influence of the pressure in said receptacle, a washer mounted on the upper end of said movable member, a cap adapted to be secured over the top of said stationary member and means therein adapted to embed in said washer for preventing any leakage therethrough.

7. An air valve for receptacles, for fluid under pressure including a head, a stem integral with the head and having external threads on a portion thereof, a valve stem surrounding the first mentioned stem and extending thereabove, a valve carrying member movably mounted in the upper end of the valve stem, the lower end of said valve carrying member in the upper end of the first mentioned stem having an exteriorly threaded extension, a flexible tube connecting the valve carrying member with the first mentioned stem, a substantially cone-shaped nipple entered in each end of the flexible tubular member and adapted to extend around portions of the first mentioned stem, and the valve carrying member, and sleeves adapted to engage the externally threaded portions of said first mentioned sleeve and said valve carrying member to lock said nipples into position on said parts and compress the ends of the flexible tubular member to form seals.

In witness whereof, I have hereunto affixed my signature.

CHAUNCEY B. EARNHEART.